United States Patent [19]

Fujita et al.

[11] 4,078,855
[45] Mar. 14, 1978

[54] ELECTRO-OPTICAL DISPLAY DEVICE

[75] Inventors: Masanori Fujita, Matsudo; Sukenori Suzuki, Narashino, both of Japan

[73] Assignee: Kabushiki Kaisha Seikosha, Japan

[21] Appl. No.: 604,780

[22] Filed: Aug. 14, 1975

[30] Foreign Application Priority Data

Aug. 14, 1974 Japan .................................. 49-93081

[51] Int. Cl.$^2$ ............................................. G02F 1/13
[52] U.S. Cl. .................................... 350/356; 350/343
[58] Field of Search ................................. 350/160 LC

[56] References Cited

U.S. PATENT DOCUMENTS 3,592,526 7/1971 Dryer ...................... 350/160 LC X

FOREIGN PATENT DOCUMENTS 2,058,104 5/1972 Germany ...................... 350/160 LC

*Primary Examiner*—John K. Corbin
*Assistant Examiner*—Rolf Hille
*Attorney, Agent, or Firm*—Robert E. Burns; Emmanuel J. Lobato; Bruce L. Adams

[57] ABSTRACT

An electro-optical display device comprises two electrode plates disposed in superposed spaced relationship from each other with a clearance therebetween, and a substance which exhibits an electro-optical effect, such as liquid crystal material, disposed within the clearance. A plurality of display electrodes are mounted in a predetermined pattern on one electrode plate and a plurality of common electrodes are mounted on the other electrode plate respectively facing predetermined ones of the display electrodes to define therewith display characters. A network of electrical conductors is mounted on the two electrode plates and electrically connected in a predetermined array to the said display and common electrodes. A conductive adhesive electrically connects together, at prescribed junctions, the electrical conductors which are mounted on the two electrode plates. The conductive adhesive comprises a mixture of conductive particles having a size substantially equal to the clearance between said electrode plates interspersed in a non-conductive adhesive. The mixing ratio of the conductive particles does not exceed 60% based on the total volume of the conductive adhesive.

8 Claims, 5 Drawing Figures

ELECTRO-OPTICAL DISPLAY DEVICE

BACKGROUND OF THE INVENTION

This invention relates to an electro-optical display device using, for example, material liquid crystal, and to a process for the preparation thereof.

In conventional electro-optical display devices using, for example, liquid crystal elements, connection of the facing electrode plates is performed according to a method in which after hot bonding of a sealant, a conductive adhesive is cast at prescribed points, or a method in which a conductive adhesive is coated before sealing and then, press-bonding is conducted. However, when the number of connection points is increased, it is difficult to connect facing electrode plates according to such conventional methods. Therefore, there have been proposed a method in which a conductive adhesive is printed according to the screen printing method or the like on one electrode plate at points to be connected and both the electrode plates are press-bonded with a sheet-like frame of a thermoplastic resin such as Myler, disposed between the two plates, and a method in which a conductive adhesive is screen-printed on one electrode plate in the same manner as above, a sealant such as epoxy resin or a low-melting-point glass is printed on the other electrode plate and both the electrode plates are pressbonded. In such method, however, since two kinds of printing patterns are necessary and both the conductive adhesive and sealant should be employed, the preparation process requires considerable time and labor.

SUMMARY OF THE INVENTION

This invention is to overcome the foregoing defects and disadvantages involved in the conventional methods.

In accordance with the fundamental aspect of this invention, there is provided an electro-optical display device comprising two facing electrode plates, a substance having an electro-optical effect which is sealed in a clearance between the two electrode plates, a plurality of electrodes mounted on one electrode plate, take-up wires connected to said electrodes, connecting wires for connecting said electrodes to external circuit wires, common electrodes mounted on the other electrode plate to face said display electrodes, take-out wires connected to said common electrodes, coupling wires for connecting common take-out wires from said display electrodes and from common electrodes to each other, a sealant for sealing said two electrode plates and preventing flow-out of said substance having an eletro-optical effect, and a conductive adhesive for connecting electrically said connecting wires and take-out wires of both the display electrodes and common electrodes and said coupling wires at prescribed junctions, wherein said conductive adhesive and said sealant are formed by incorporating in a non-conductive adhesive conductive particles having a size substantially equal to the clearance between both the electrode plates, the mixing ratio of said conductive particles being not larger than 60% based on the total volume.

It is a primary object of this invention to perform sealing of electrode plates and connection of wires simultaneously by using a conductive adhesive.

Another object of this invention is to uniformalize the thickness of the seal formed between the electrode plates.

BRIEF DESCRIPTION OF THE DRAWINGS

The foregoing and other objects of this invention will be apparent from the following description and claims by reference to the accompanying drawings, in which:

DETAILED DESCRIPTION OF PREFERRED EMBODIMENT

One embodiment of this invention will now to be described by reference to the accompanying drawings.

Figure 1:
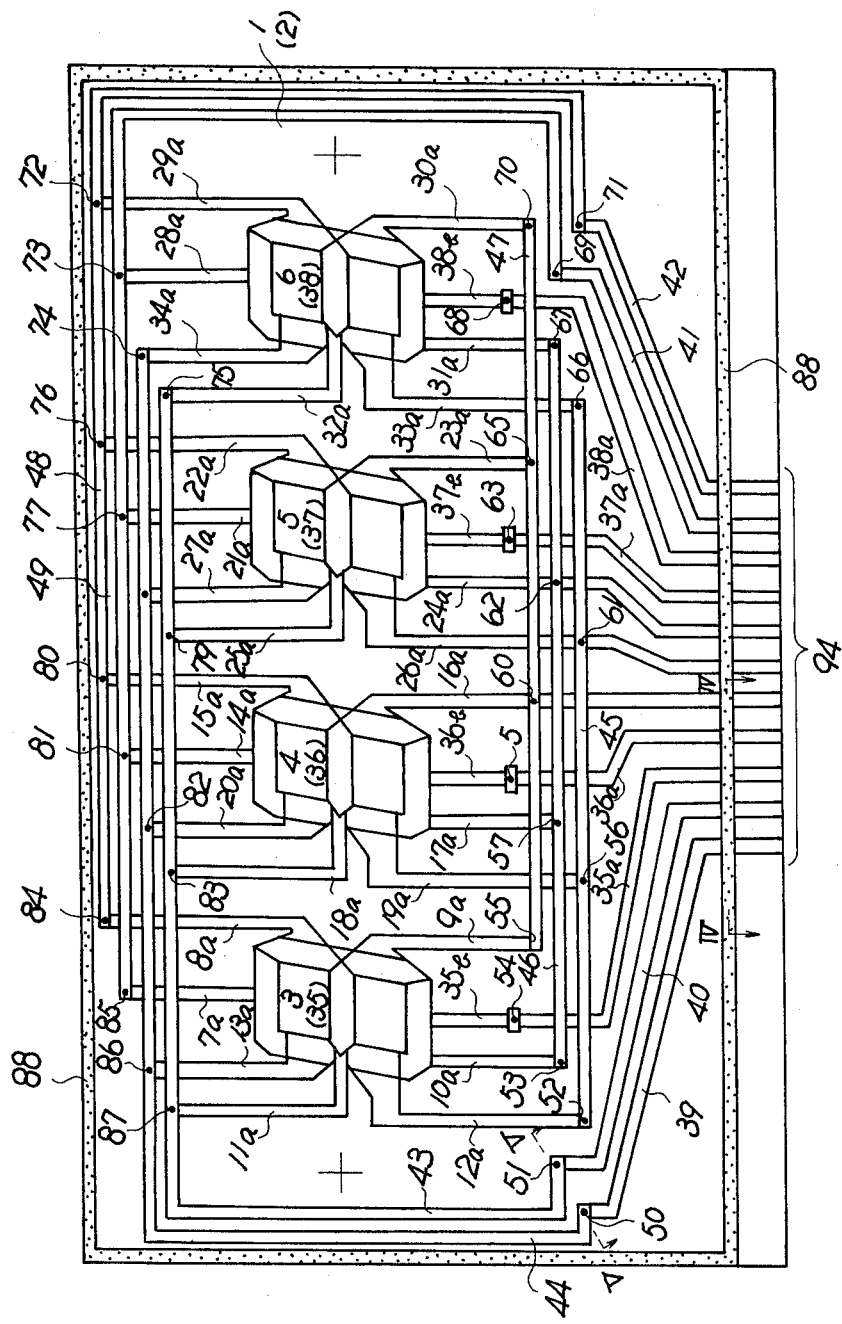
FIG. 1 is a front view illustrating one embodiment of this invention.

Reference numerals 1 and 2 indicate facing electrode plates. As is shown in FIG. 1, one plate 1 is composed of a non-conductive transparent glass or the like, and transparent film electrodes 3, 4, 5 and 6 are formed on the upper face of the plate 1 by etching films of indium oxide, tin oxide or the like formed by spraying or vacuum deposition.

Each of the film electrodes is a display electrode composed of 7 segments 7 to 13, 14 to 20, 21 to 27 or 28 to 34, and take-out wires 7a, 8a, . . . 34a are formed to extend from respective electrode segments. Among these wires, the wires 16a, 24a and 26a are extended up to the lower end portion of the electrode plate 1. Connecting wires 35a, 6a, 37a and 38a disposed below respective column electrodes 3 to 6 so that they are connected to take-out wires 35b, 36b, 37b and 38b of common electrodes 35, 36, 37 and 38 detailed hereinafter and illustrated in FIG. 3. Further, four connecting wires 39, 40, 41 and 42 are mounted on the electrode plate 1, and each of these connecting wires is extended up to the lower end portion of the electrode plate 1.

Figure 3:
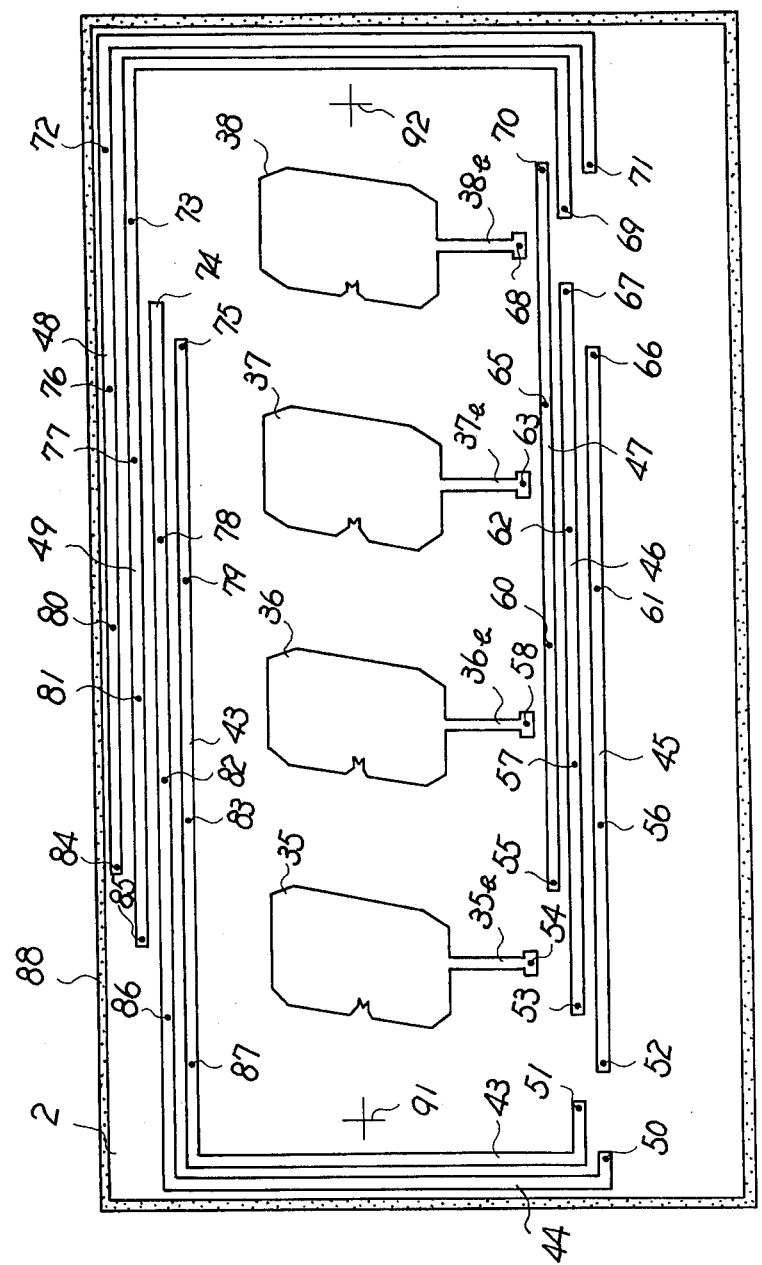
FIG. 3 is a front view illustrating the other facing electrode plate.

The other electrode plate 2 is shown in FIG. 3 and it is composed of ceramic or glass, and on the electrode plate 2, common electrodes 35, 36, 37 and 38 are formed at positions confronting corresponding 7-segmented transparent electrodes 3, 4, 5 and 6. Each of the common electrodes 35 to 38 is composed of a non-transparent film of nickel, aluminum, silver, gold, platinum or the like. Take-up wires 35b, 36b, 37b are formed on the common electrodes 35 to 38, respectively, and their lower end portions are piled on the upper end portions of the above-mentioned connecting wires 35a, 36a, 37a and 38a. In the surrounding portions of the common electrodes 35 to 38, coupling wires 43, 44, 45, 46, 47, 48 and 49 are disposed to connect common wires among the take-out wires 7a to 34a of the display electrode segments 7 to 34 formed on the first-mentioned electrode plate 1. For example, take-out wires 8a, 15a, 22a and 29a of the display electrode segments 8, 15, 22 and 29 are connected by the coupling wire 48. This coupled state is seen in FIG. 1. In this case, a conductive adhesive A described hereinafter is screen-printed on junctions 50 to 87 for all of take-out wires 7a to 34a and 35b to 38b, connecting wires 35a to 38a and coupling wires 39 to 49. Junctions 50 to 87 on which the adhesive A is to be printed are shown in FIG. 3.

On the outer peripheral portion of the electrode plate 2, a sealant is coated at a prescribed sealing area 88 by the screen printing method or the like. This sealant is composed of the same material as the above-mentioned adhesive A.

Each of the electrodes 3 to 6 and 35 to 38 and wires 11a to 33a, 35b to 38b and 43 to 49 mounted on the electrode plates 1 and 2 has a thickness of about 100 to about 3000 Å, and the clearance formed between the electrodes 3 to 6 and 35 to 38 by the sealant A is about 5 to about 100 microns. Accordingly, even when both the electrode plates 1 and 2 are combined and stacked so that the inner faces of the electrode plates 1 and 2 confront each other, there is no danger of occurrence of short circuits in the electrodes.

Figure 2:
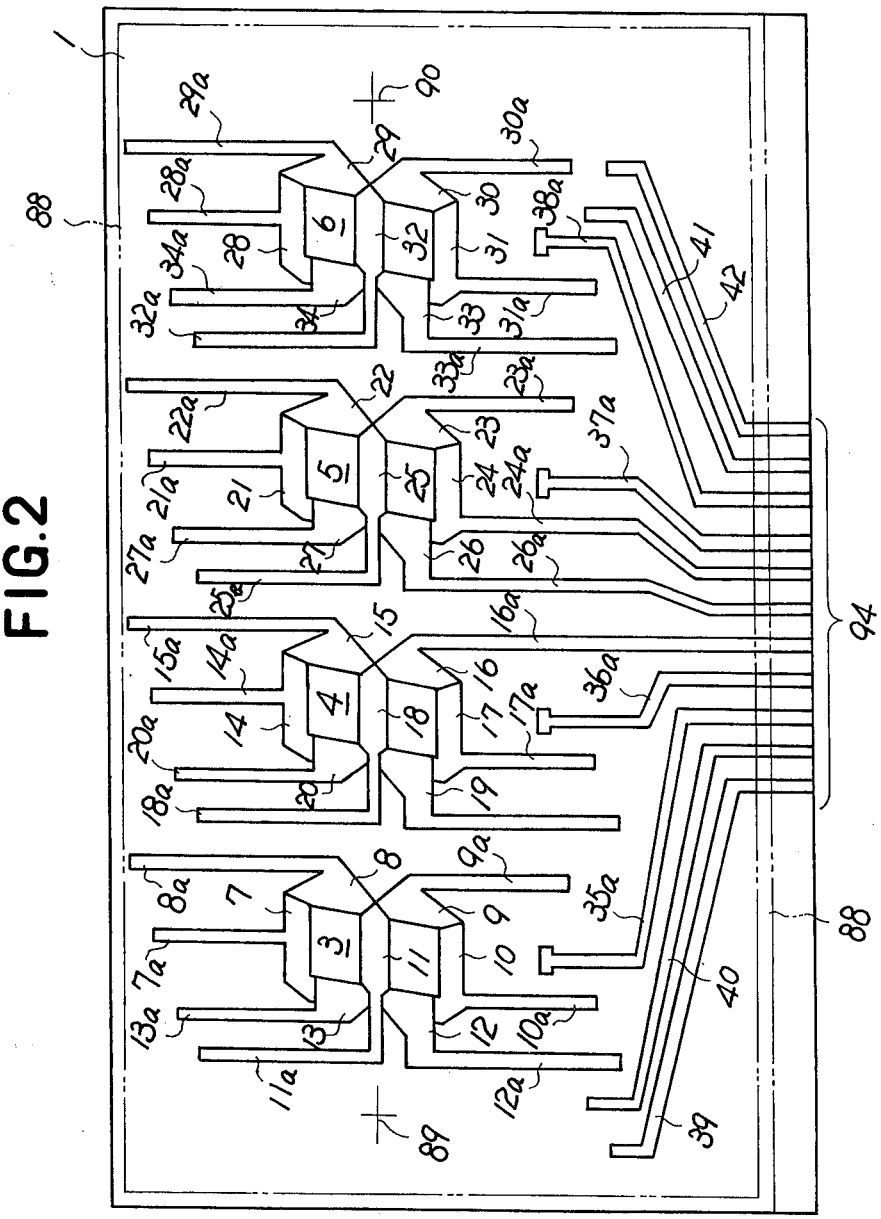
FIG. 2 is a front view illustrating one of the facing electrode plates.

According to the preparation process of this invention, electrodes 3 to 6 and other wires are formed on one electrode plate 1 by etching or the like as shown in FIG. 2, common electrodes 35 to 38 and coupling wires 43 to 49 are similarly formed on the other electrode plate 2 as shown in FIG. 3, and the conductive adhesive A and sealant A are coated at prescribed positions according to the screen printing method or the like. Then, both the electrode plates 1 and 2 are superposed upon each other at standard positioning points 89, 90, 91 and 92 so that the inside electrode faces of the electrode plates 1 and 2 confront each other, and both the plates are pressbonded in this piled or superposed state under suitable curing conditions. A substance 93 having an electro-optical effect, such as a liquid crystal, is injected in a space surrounded by the sealing position 88, and then sealing is effected. Thus, according to the process of this invention, connection of electrodes and sealing of the electro-optical substance between the electrode plates can be accomplished by one printing of the conductive adhesive. The so prepared display device is shown in FIG. 1.

All of the above-mentioned wires are connected to a group of input terminals 94 disposed on the same plane on one electrode plate 1.

The conductive adhesive A and sealant A are composed of the same material as the adhesive and will now be described.

Both the conductive adhesive and sealant are formed by incorporating conductive particles 96 into a nonconductive adhesive 95 having a high adhesion strength and a good bonding adaptability, such as an epoxy type adhesive and a low-melting-point glass. As the conductive particle, a member selected appropriately from carbon powder, SiC powder and metal powder such as reduced Ag powder, Au powder, Pd/Ag powder, Ni powder and In powder is employed. It is preferred that the particles have substantially the same particle size and shape. The upper limit of the mixing ratio of the conductive particles is about 60% based on the total volume. This limitation is set because in the display device of this invention the conductivity extends in the thickness direction between the facing electrodes and the device should be non-conductive in the lateral direction. When the conductive particles are incorporated in an amount exceeding about 60% by volume, the display device is conductive also in the lateral direction. This can be confirmed by solidifying an adhesive A incorporated with conductive particles 96 under application of no pressure and examining whether the resulting resistance value is higher than the desired insulation resistance value. In short, the conductive adhesive A to be used in this invention is non-conductive in the lateral direction in the solidified state. Practically, the resistance in the lateral direction begins to be lowered when the amount of the conductive particles exceeds 30% by volume and a substantial conductivity is manifested in the lateral direction when the amount of the conductive particles is about 60%, though this tendency differs to some extent depending on the shape of the conductive particles actually employed. Therefore, in the practical operation, it is preferred that the amount of the conductive particles be smaller than 30% by volume. The diameter of the conductive particles 96 decides the clearance between the electrodes, and in general, particles having a diameter of 5 to 100 microns are used. For example, when the desired clearance between the electrodes is 10 microns, conductive particles having a diameter of 10 microns are used.

Figure 4:
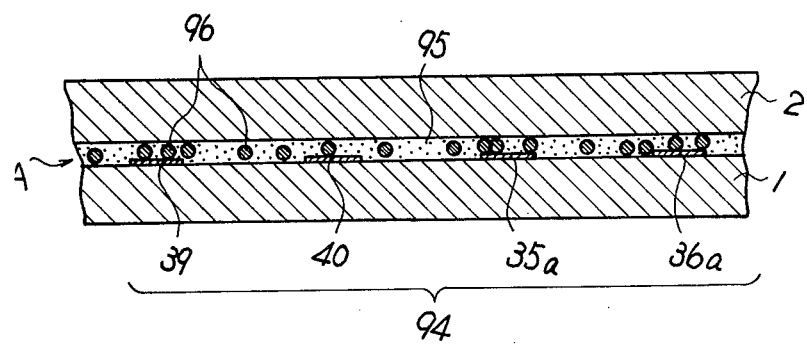
FIG. 4 is an enlarged view illustrating the section taken along the line IX—IX in FIG. 1.

States of the group of input terminals 94 (39, 40, 35a, 36a, 16a, ... ) and the sealant A will now be illustrated by reference to FIG. 4. The sealant A is the same material as the conductive adhesive A and is formed by incorporating conductive particles 96 into a non-conductive adhesive material 95. In the embodiment shown in FIG. 4, the mixing ratio of the conductive particles 96 is about 20% by volume. The particles are substantially uniformly dispensed in the adhesive material 95 and hence, these particles are not in contact with one another at all. Therefore, no conductivity is manifested in the sealant A in the lateral direction and hence, wires 39, 40, 35a and 36a are not connected electrically with one another at all. Further, since the particles 96 are substantially equal in the diameter and their diameter is substantially equal to the clearance between the electrodes, the particles also function as a spacer. Accordingly, in this invention, it is possible to set the clearance between the electrode plates at a desired value without provision of a separate spacer.

Figure 5:
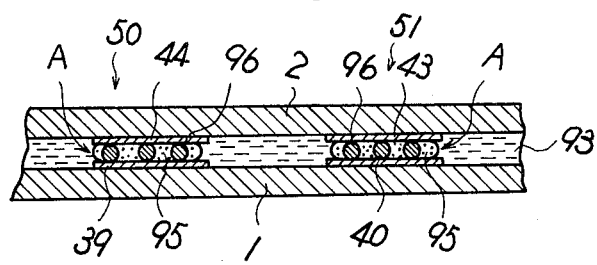
FIG. 5 is an enlarged view illustrating the section taken along the line V—V in FIG. 1.

The state of junctions 50 and 51 taken as instances of junctions 50 to 87 will now be described by reference to FIG. 5.

The junction 50 having wires 39 and 44 and the junction 51 having wires 40 and 43 are formed on the electrode substrates 1 and 2, respectively, and the conductive adhesive A of this invention is applied to the wires 39 and 40. By conductive particles 96 incorporated in the adhesive A, wires 39 and 44 are connected to corresponding wires 40 and 43 in an electrically conductive state.

In order to improve the conductivity of the adhesive A of this invention in the thickness direction, conductive fine particles may further be incorporated into the adhesive A. It is preferred that conductive fine particles have a scale-like form having a size corresponding to about 1/10 of the diameter of the conductive particles 96. The fine particles can be incorporated in an amount of up to 30% by volume, but care should be taken so that no conductivity is manifested in the lateral direction by incorporation of the conductive fine particles.

In order to improve the non-conductivity in the lateral direction in the adhesive A to be used in this invention, insulating particles having a size smaller than that of the conductive particles 96 may further be incorporated in the adhesive. The amount incorporated of insulating particles is determined depending on the desired insulating resistance in the lateral direction.

In the foregoing embodiment, wire junctions 50 to 87 are formed separately from the sealing position 88, but when the display device is designed so that the junctions are present at the sealing position 88, connection of wires can be omitted.

What we claim is:

1. An electro-optical display device comprising two facing electrode plates, a substance having an electro-optical effect which is sealed in a clearance between the two electrode plates, a plurality of display electrodes mounted on one of said electrode plates, take-out wires connected to said electrodes, connecting wires for connecting said electrodes to external circuit wires, common electrodes mounted on the other of said electrode plates facing said display electrodes, take-up wires connected to said common electrods, coupling wires for connecting common take-out wires from said display electrodes and from common electrodes to each other, a sealant for sealing together said two electrode plates and preventing flow-out of said substance having an electro-optical effect, and a conductive adhesive for connecting electrically said connecting wires and take-out and take-up wires of both the display electrodes and common electrodes and said coupling wires at prescribed junctions, wherein said conductive adhesive and said sealant are formed by incorporating in a non-conductive adhesive conductive particles having a size substantially equal to the clearance between both the electrode plates, the mixing ratio of said conductive particles being not larger than 60% based on the total volume.

2. An electro-optical display device comprising: two electrode plates disposed in superposed spaced relationship from each other with a clearance therebetween; a substance which exhibits an electro-optical effect disposed within said clearance; a plurality of display electrodes mounted in a predetermined pattern on one of said electrode plates; a plurality of common electrodes mounted on the other of said electrode plates and respectively facing predetermined ones of said display electrodes; a network of electrical conductors mounted on said two electrode plates and electrically connected in a predetermined array to said display and common electrodes; and means including a conductive adhesive for electrically connecting at prescribed junctions said electrical conductors which are mounted on said two electrode plates, said conductive adhesive comprising a mixture of conductive particles having a size substantially equal to the clearance between said electrode plates interspaced in a non-conductive adhesive material, and wherein the mixing ratio of said conductive particles does not exceed 60% based on the total volume of the conductiive adhesive.

3. An electro-optical display device according to claim 2; wherein said mixing ratio does not exceed 30%.

4. An electro-optical display device according to claim 3; wherein said conductive particles have a diameter between 5 to 100 microns.

5. An electro-optical display device according to claim 2; wherein said conductive particles have a diameter between 5 to 100 microns.

6. An electro-optical display device according to claim 2; wherein said conductive particles are laterally spaced apart by said non-conductive adhesive material distances sufficient to render said conductive adhesive electrically non-conductive in the lateral direction while being electrically conductive in the transverse direction between said two electrode plates to electrically connect the electrical conductors on said plates at said prescribed junctions.

7. An electro-optical display device according to claim 6; wherein said mixing ratio does not exceed 30%.

8. An electro-optical display device according to claim 6; wherein said conductive particles have a diameter between 5 to 100 microns.

* * * * *